United States Patent
Krishnan et al.

(10) Patent No.: US 9,533,625 B2
(45) Date of Patent: Jan. 3, 2017

(54) BIKE RACK ATTACHMENT FOR VEHICLE

(71) Applicant: Ford Global Technologies, LLC, Dearborn, MI (US)

(72) Inventors: Venkatesh Krishnan, Canton, MI (US); Scott Cutler, Ann Arbor, MI (US); Eswar Timmavajjala, Dearborn, MI (US); Benjamin Lee, Dearborn, MI (US); Vikas Bhatt, Canton, MI (US); Ravikumar Ranganthan, Farmington Hills, MI (US); Brandon Buckhalt, Belleville, MI (US); Pete Christ Korovesis, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 14/516,167

(22) Filed: Oct. 16, 2014

(65) Prior Publication Data

US 2016/0107583 A1    Apr. 21, 2016

(51) Int. Cl.
*B60R 9/10*    (2006.01)
*B60R 13/10*    (2006.01)
(Continued)

(52) U.S. Cl.
CPC . *B60R 9/10* (2013.01); *B60R 9/06* (2013.01); *B60R 13/105* (2013.01); *B60R 2011/0082* (2013.01); *B60R 2011/0085* (2013.01)

(58) Field of Classification Search
CPC ...... B60R 9/06; B60R 9/12; B60R 2011/0094; B60R 2011/0085; B60R 13/105; B60R 2011/0082; Y10S 224/924
(Continued)

(56) References Cited

U.S. PATENT DOCUMENTS

| 5,096,102 A * | 3/1992 | Tolson | B60R 9/06 224/501 |
| 6,581,955 B2 * | 6/2003 | Aquinto | B60D 1/485 280/491.5 |

(Continued)

FOREIGN PATENT DOCUMENTS

| CA | 2239914 C * | 11/2004 | B60R 9/06 |
| DE | 102005006113 A1 * | 8/2006 | B60R 9/06 |

(Continued)

*Primary Examiner* — Justin Larson
(74) *Attorney, Agent, or Firm* — Burgess Law Office, PLLC; Raymond I. Coppiellie

(57) ABSTRACT

A mechanism for attaching a bike rack to a vehicle including a support member located behind an exterior wall of the vehicle. An attachment assembly, including a receiver operative to move between the first, stowed position any second, use position is connected to the support member. The exterior wall includes a removable portion wherein upon removal provides access to the attachment assembly. Once the removable portion is removed, the attachment assembly, including the receiver is moved from the first, stowed position to the second, use position wherein the bike rack then connects to the receiver. Additionally, the removable portion may include a detachable license plate bracket, which upon being detached from the vehicle, can be mounted to the rear of a bike rack. Sensors are mounted on the license plate bracket to allow for a functional back-up or park assist when the bike rack is attached to rear of the vehicle.

18 Claims, 7 Drawing Sheets

(51) Int. Cl.
*B60R 9/06* (2006.01)
*B60R 11/00* (2006.01)

(58) Field of Classification Search
USPC .......................................................... 224/511
See application file for complete search history.

(56) References Cited

U.S. PATENT DOCUMENTS

| | | | | |
|---|---|---|---|---|
| 6,752,302 | B2 * | 6/2004 | Anton | B60R 9/06 224/517 |
| 6,874,806 | B1 * | 4/2005 | Blake | B60D 1/485 150/166 |
| 6,910,705 | B1 * | 6/2005 | Harwood | B60D 1/60 280/507 |
| 7,591,478 | B2 * | 9/2009 | Christopher | B60D 1/46 280/505 |
| 7,740,295 | B2 * | 6/2010 | Rein | B60R 9/06 293/128 |
| 9,221,406 | B2 * | 12/2015 | Angara | B60R 13/105 |
| 9,290,132 | B2 * | 3/2016 | Anton | B60R 9/06 |
| 2007/0090142 | A1 * | 4/2007 | Chuang | B60P 3/07 224/496 |
| 2011/0108592 | A1 | 5/2011 | Lee et al. | |
| 2012/0205413 | A1 | 8/2012 | Degenstein et al. | |

FOREIGN PATENT DOCUMENTS

| | | | | |
|---|---|---|---|---|
| DE | EP 2284042 A3 * | 4/2011 | | B60D 1/488 |
| DE | 102010042018 A1 | 4/2012 | | |
| DE | 102007024971 B4 * | 12/2013 | | B60J 5/103 |
| DE | EP 2428403 B1 * | 1/2014 | | B60D 1/06 |
| EP | 1568542 A1 | 8/2005 | | |
| EP | 1886875 A2 | 2/2008 | | |
| FR | 2905632 A1 | 3/2008 | | |
| WO | 2005084979 A1 | 9/2005 | | |

* cited by examiner

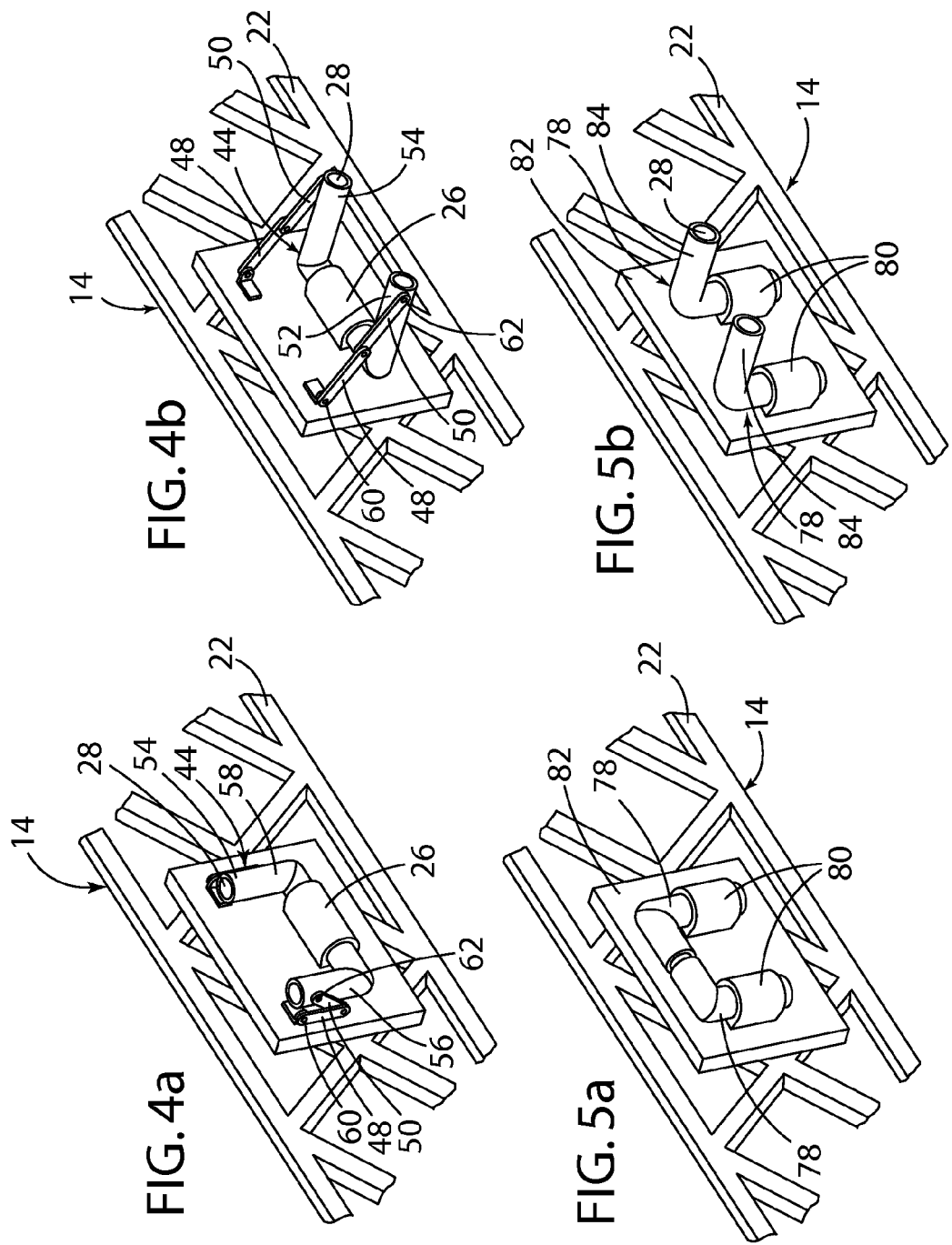

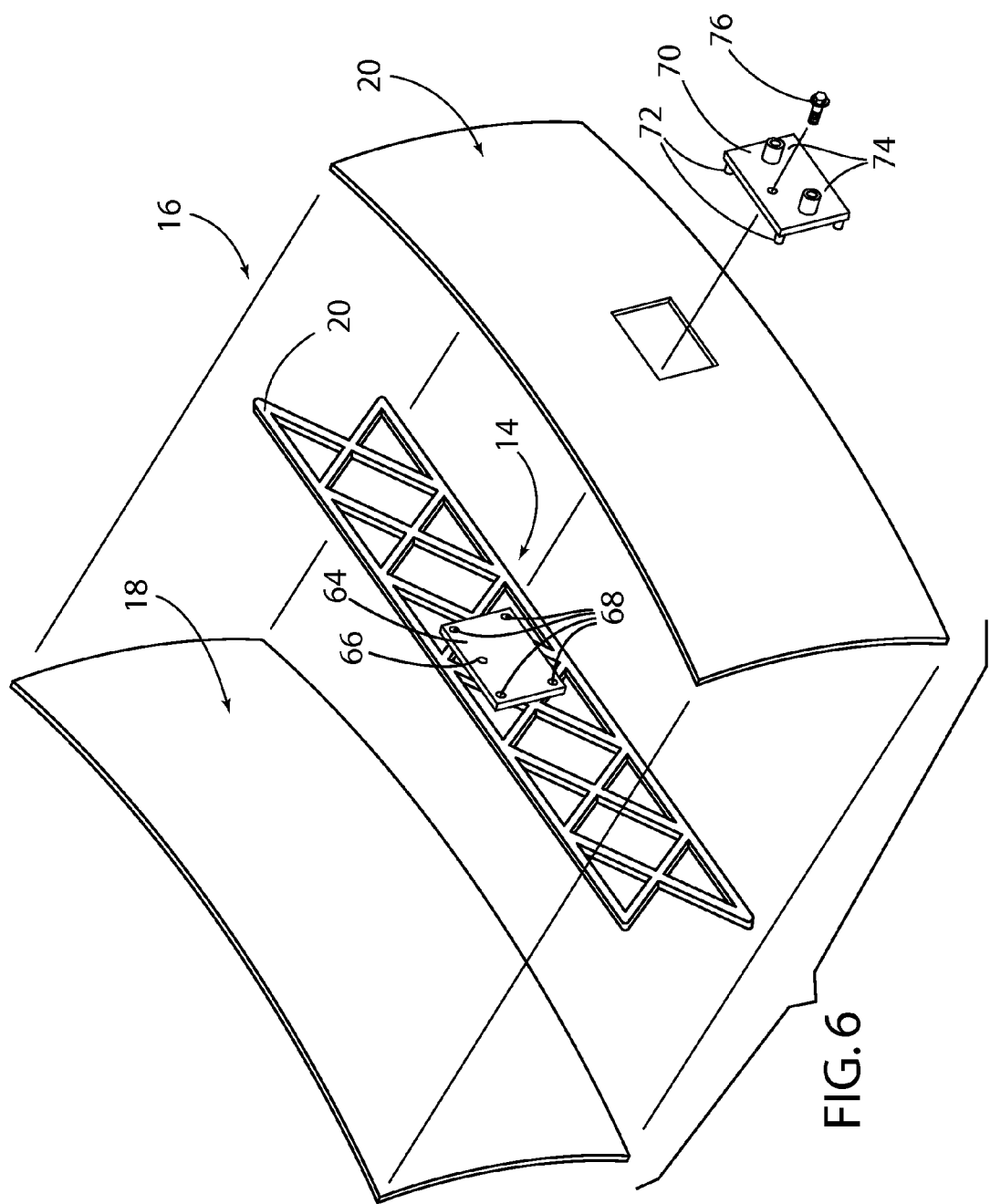

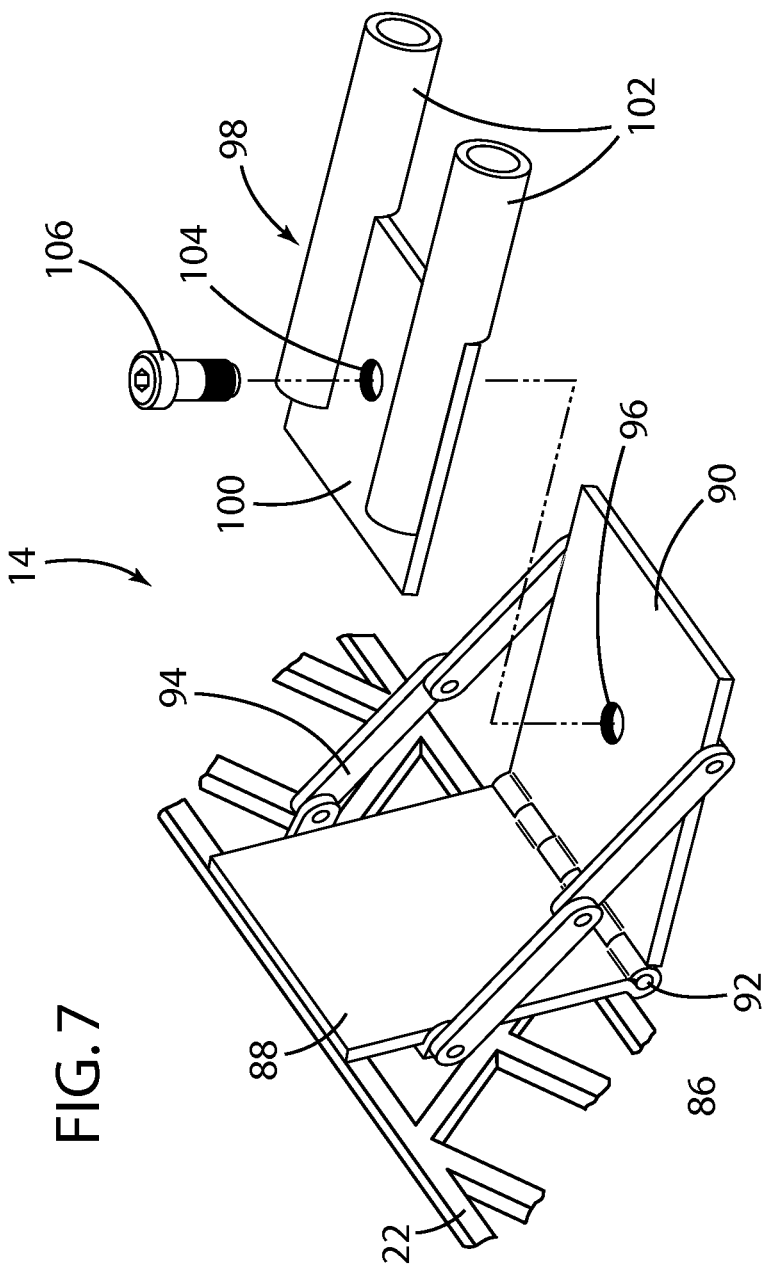

A BIKE RACK ATTACHMENT FOR VEHICLE

CROSS-REFERENCE TO RELATED APPLICATIONS

Not applicable

BACKGROUND OF THE INVENTION

1. Field of the Invention

The present invention relates generally to a vehicle bike rack attachment; and more specifically a vehicle bike rack attached to a vehicle liftgate, trunk lid, or decklid.

2. Description of Related Art

Vehicle bike racks often rest on or are supported by the vehicle body, often the liftgate, decklid, or trunk lid. Straps attached to the vehicle body secure the rack to the vehicle body. Resting or supporting the bike rack on the vehicle body results in discrete attachment points or sites, which in some instances may result in body damage such as dents, paint scratches or chips, or cracked glass. The straps may vibrate or rub on the vehicle surface resulting in body damage. In some instances, such vehicle bike racks may obscure or cover and thereby reduce the working of the back-up sensors, rear camera and park assist. It can also block the view of the license plate.

Another type of bike rack attaches to the roof of the vehicle. Such racks may increase the difficulty in mounting the bike on a high surface and the need to avoid low clearance areas.

Either style of bike rack requires time to remove and install the rack when not in use.

SUMMARY OF THE INVENTION

A mechanism for attaching a bike rack to a vehicle including a support member located behind an exterior wall of the vehicle. An attachment assembly, including a receiver operative to move between the first, stowed position and a second, use position, is connected to the support member. The exterior wall includes a removable portion wherein upon removal provides access to the attachment assembly. In one example of the invention, the removable portion includes a detachable license plate holder.

Additionally, the detachable license plate bracket upon being detached from the vehicle and can be mounted to the rear of a bike rack. Sensors are mounted on the license plate bracket to allow for a functional back-up or park assist when the bike rack is attached to rear of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is an exploded perspective view of an alternative embodiment of the support portion of FIG. 3.

FIGS. 5a and 5b are perspective views of the embodiment of the support portion of FIG. 3.

FIGS. 6a and 6b are perspective views of an alternative embodiment of the support portion of FIG. 3.

FIG. 7 is a perspective view of an alternative embodiment of the support portion of FIG. 3.

DETAILED DESCRIPTION OF THE PREFERRED EMBODIMENTS

The following description of the preferred embodiment(s) is merely exemplary in nature and is in no way intended to limit the invention, its application, or uses.

Figure 1:
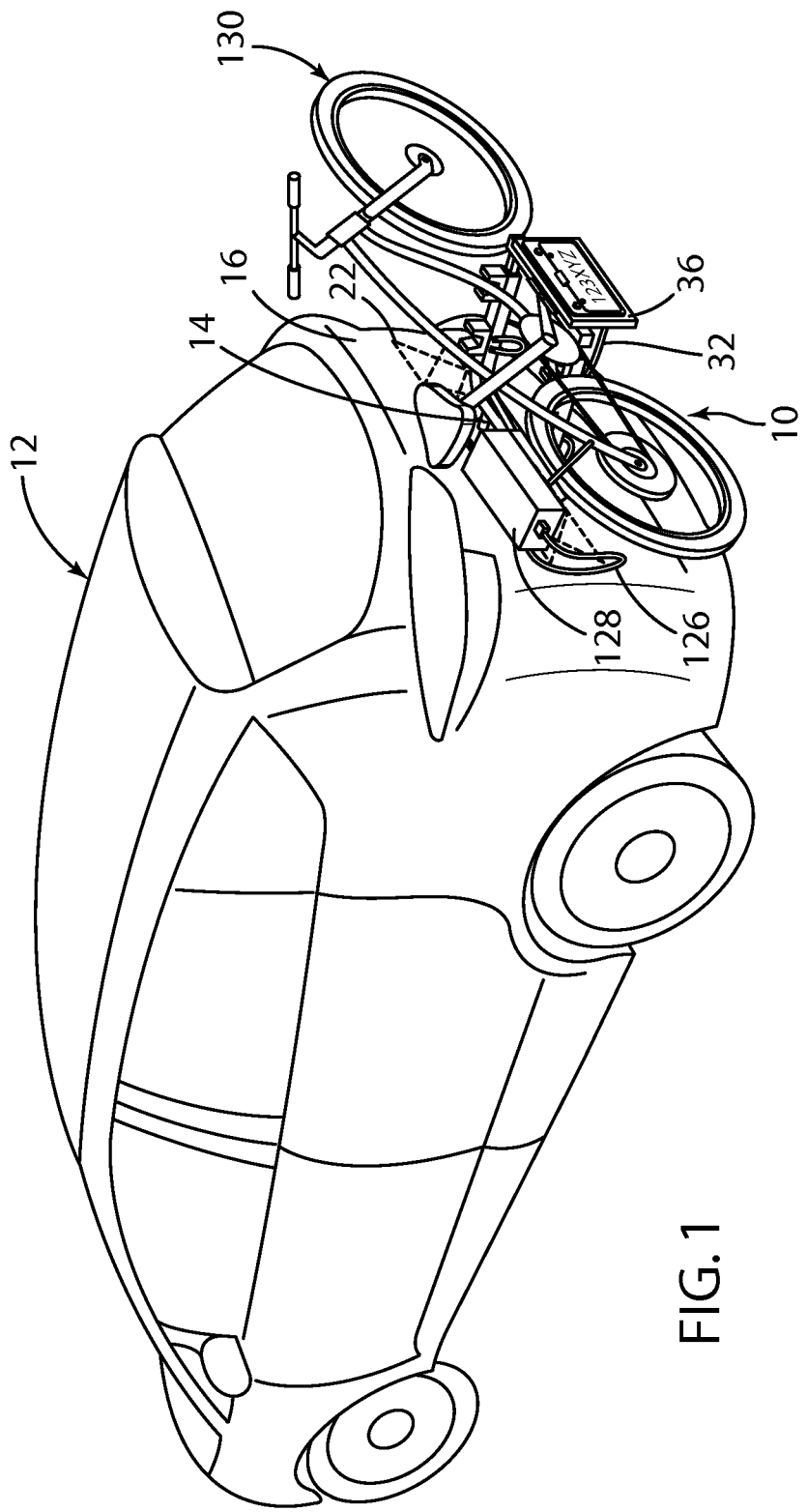
FIG. 1 is a perspective view of showing a vehicle bike rack assembly according to the present invention supporting an electric bike on a vehicle.
Figure 2:
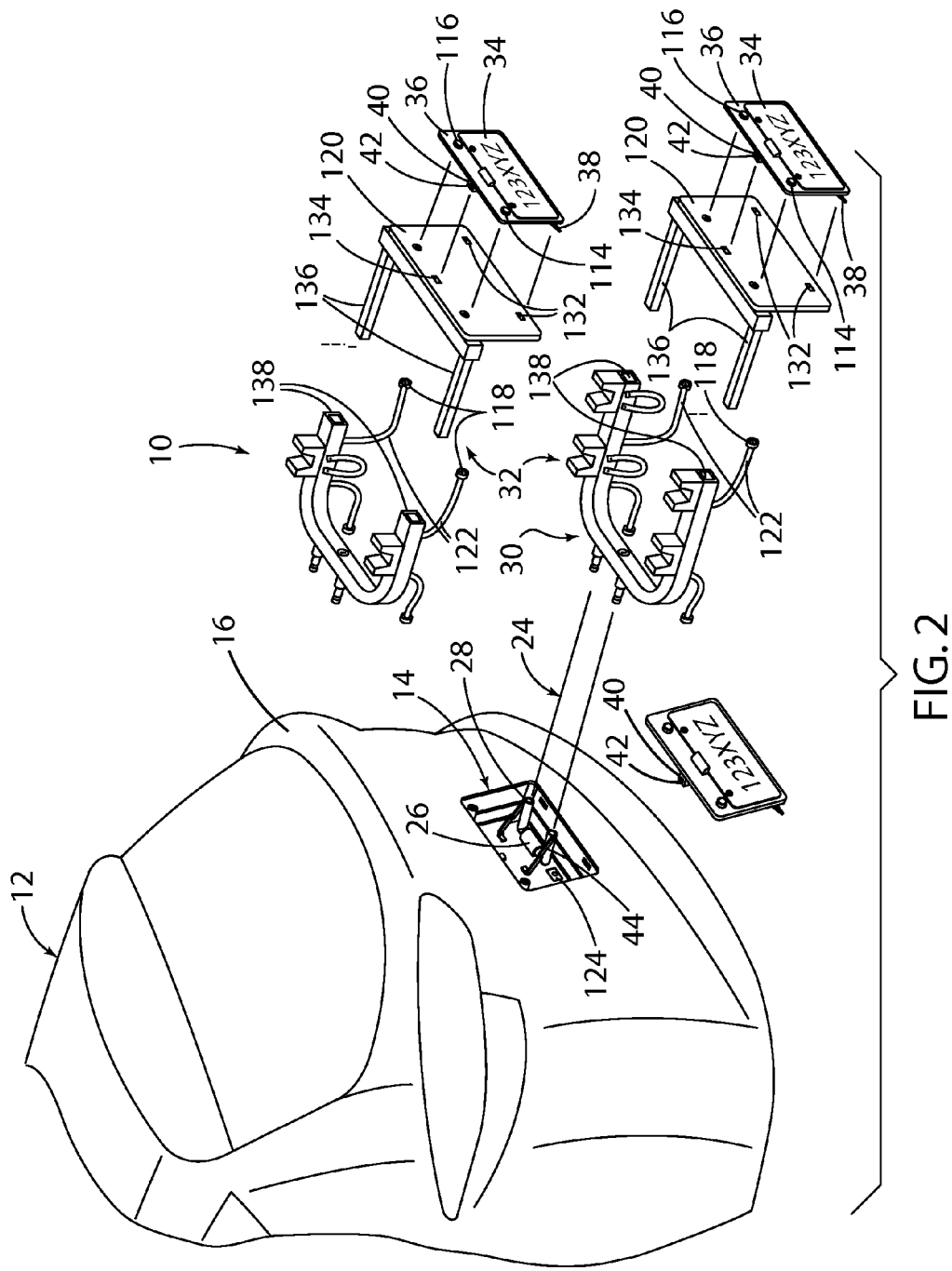
FIG. 2 is an exploded perspective view of a vehicle bike rack according to the present invention.

FIGS. 1 and 2 illustrate a bike rack system, shown generally at 10, for an automotive vehicle 12. The vehicle 12 includes a support member 14 located in the decklid/trunk lid or liftgate 16 of the vehicle 12. One example of support member 14 includes a frame located between the interior wall or shell 18 and the exterior wall or shell 20 of the vehicle 12 decklid/trunk lid or liftgate 16. A further example of the support member 14 includes a rigid framework of beams and or bars. As illustrated in the example shown in FIG. 3, the support member 14 includes beam and cross members connected together and forming a truss 22 located between the interior wall or shell 18 and the exterior wall or shell 20 of the vehicle 12 decklid/trunk lid or liftgate 16. The foregoing examples notwithstanding, the support member 14 may have any configuration capable of supporting a load extending from the vehicle 12.

As shown, the truss 22 is located in the decklid/truck lid or liftgate 16. As set forth below, the support member 14, or as illustrated truss 22, provides with the decklid/trunk lid or liftgate 16 a mechanism for supporting a load-bearing member, for example a bike rack 32.

An attachment assembly 24, including a bracket 26 and a receiver 28 connects to the support member 14. The receiver 28 sized to receive a load-bearing member 30. One example of a load-bearing member being a bike rack 32, shown in FIG. 2. Other load-bearing members, for example racks, platforms, and other carriers may be attached through the attachment assembly 24 to the support member 14.

Figure 3:
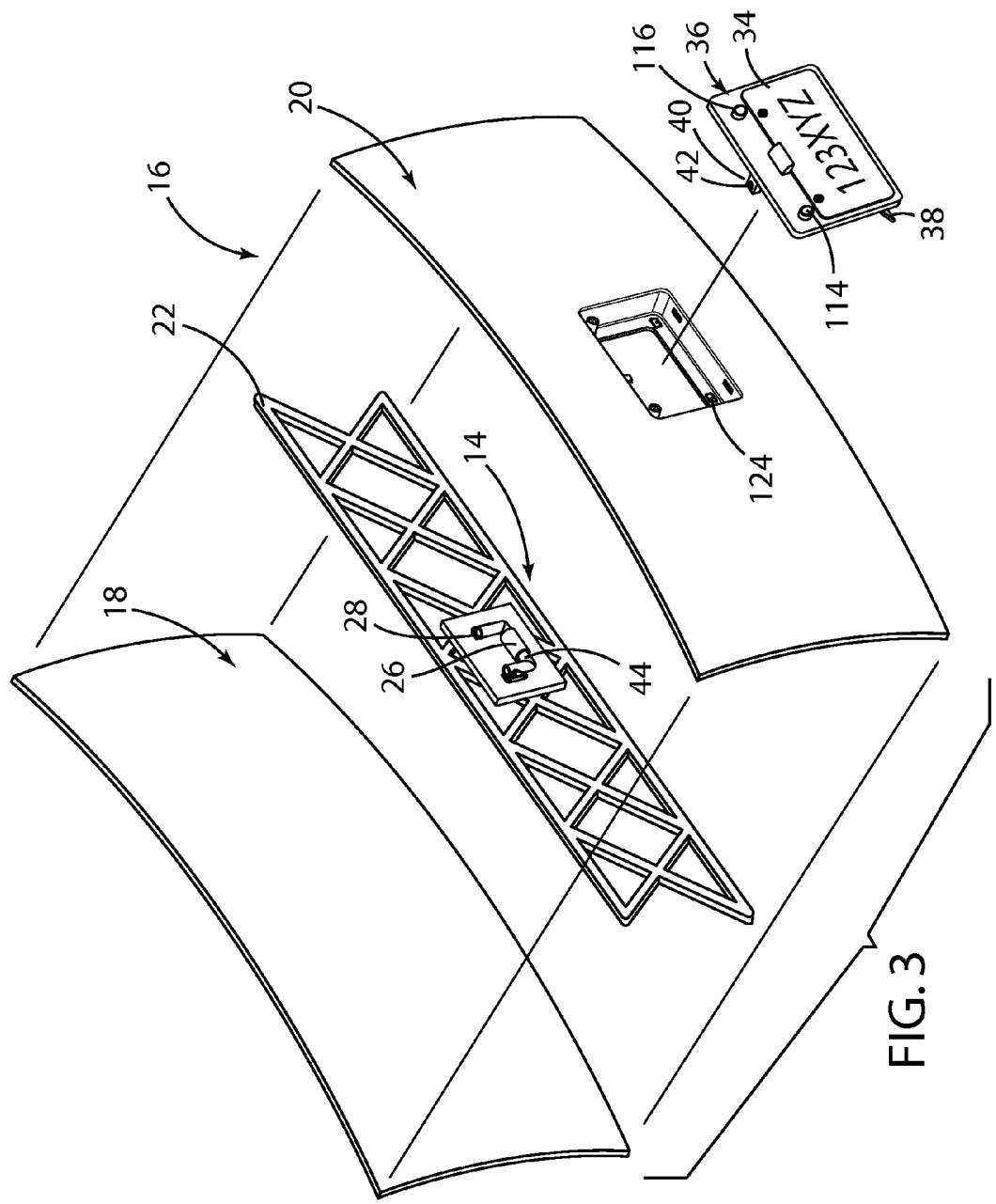
FIG. 3 is an exploded perspective view of the support portion of the vehicle bike rack assembly according to the present.

FIG. 3 schematically illustrates the attachment assembly 24 connected to the support member 14, illustrated as the truss 22. The support member 14 is located between or imbedded within the decklid/trunk lid or liftgate 16. The support member 14 receives the weight of the bike rack system 10 and distributes it over the decklid/trunk lid or liftgate 16. Distributing the load in this manner eliminates any localized loading occurring when the bike rack system 10 is connected to a discrete point on the decklid/trunk lid or liftgate 16.

FIG. 2 shows one example of the bike rack system 10 in more detail. Initially, the license plate 34 attaches to a license plate holder 36. The license plate holder 36 includes a pair of outwardly extending tabs 38 and a latch mechanism 40 that cooperate to secure the license plate holder 36 to the decklid/trunk lid or liftgate 16. The latch mechanism 40 may include a lockable spring-loaded pin 42 that engages and secures the license plate holder 36 to the decklid/trunk lid or liftgate 16. Other latch mechanisms 40 may also be used, including a solenoid and pin assembly locking mechanism actuated remotely or via a button located in the vehicle 12. To attach the bike rack 32, the license plate 34 and corresponding license plate holder 36 are removed from the vehicle 12 by unlatching the license plate holder 36 from the vehicle 12.

As illustrated in FIG. 2, the attachment assembly 24, including the receiver 28, connects to the support member 14 behind the license plate holder 36 and remain hidden behind the license plate 34 and license plate holder 36 when not in use. To use the bike rack system 10 license plate holder 36 and license plate 34 held therein are removed, exposing the attachment assembly 24. As illustrated in FIGS. 2, 3, 4a, and 4b the receiver 28 includes a U-shaped tubular member 44 pivotally secured by mounting member 46 to the bracket 26. First and second links 40, 50 extend between the outer ends 52, 54 of each of the legs 56, 58 of the U-shaped member 44 and the bracket 26. Each link 40, 50 is a foldable member having a center pivot point 60, 62. Each link 48, 50 may include a locking assembly wherein when fully extended, each link 48, 50 locks in position and prevents movement of the outer ends 52, 54 of the U-shaped tubular member 44. Accordingly, as illustrated, the U-shaped tubular member 44 folds outward from a first, stowed position located adjacent the bracket 26 to a second, use position wherein the U-shaped to the member extends outwardly from the bracket 26. As disclosed, the links 40, 50 may lock the U-shaped tubular member 44 in the second, use position, shown in FIGS. 2 and 4b. Pivotally mounting or using a hinge-mechanism to mount the U-shaped tubular member 44 to the bracket provides a mechanism wherein the receiver 28, illustrated as the U-shaped tubular member 44, folds to a first, stowed position, see FIGS. 3 and 4a making it possible to cover the receiver 28 from view with license plate 34 and corresponding license plate holder 36 when bike rack system 10 is not in use. In a further example, a spring member connected between the bracket 26 and the U-shaped tubular member 44 operates to retract the U-shaped tubular member 44 to its first, stowed position. A latch or other connector holds the U-shaped tubular member 44 in the first, stowed position.

FIGS. 5a and 5b illustrates another example of a bracket 26 and receiver 28 combination using a pair of L-shaped tubular members 78 pivotally supported in mounting members 80. As illustrated in FIG. 5a, in the first, stowed position the L-shaped tubular members 78 are positioned adjacent the attachment plate 82. FIG. 5b Illustrates the second, use position wherein a leg portion 84 of the L-shaped tubular members 78 extends outwardly from the attachment plate 82. As with the previous examples, link members can be used to lock the L-shaped tubular members 78 in the second, use position with springs being used to retract and hold the L-shaped tubular members 78 in the first, stowed position.

FIG. 6 shows an alternative embodiment of an attachment assembly 24 for use with the bike rack system 10. The attachment assembly 24 includes a mounting plate 64 having a threaded bore 66 and a plurality of mounting apertures 68 secured to the support member 14. A threaded fastener 76 releasably secures an attachment plate 70 having a plurality of mounting pins 72 on one side thereof and receivers, shown as outwardly extending tubular members 74, located on the opposite side thereof to the mounting plate 64. In use, the mounting pins 72 are received in the plurality of mounting apertures 68 on the mounting plate 64. Various types or styles attachment plates 70, that is attachment plates 70 having different configurations of receivers 28, can be attached to the standard mounting plate 64. In addition, the attachment plate 70 can be directly connected to the bike rack 32 without the need for a receiver 28 wherein the bike rack is attached by connecting the attachment plates 70 to the mounting plate 64.

FIG. 7 shows an example of a further embodiment of the attachment assembly 24 including a hinged mounting plate 86 having a first portion 88 and a second portion 90 pivotally connected by a pin 92. The first portion 88 attached to the support member 14. A pair of pivoting link members 94 connect the first portion 88 to the second portion 90. As with the previous examples, the hinged mounting plate 86 moves between a first, stowed position and a second, use position, with the second, use position shown in FIG. 7 wherein the second portion 90 unfolds or pivots into a position whereby it extends outwardly from the support member 14. The second portion 90 includes a threaded bore 96. The receiver, seen generally at 98, includes an attachment member 100 extending between a pair of tubular members 102. As illustrated, the attachment member 100 includes an aperture 104 that lines up with the threaded bore 96 in the second portion 90 of the hinged mounting plate 86. A threaded fastener 104 extends through the aperture 104 and is threadably received in the threaded bore 96 to connect the receiver 98 to the hinged mounting plate 86. As with the previous examples, the attachment member 100 can be directly connected to the bike rack 32 without the need for a receiver 98 wherein the bike rack 32 is attached by connecting the attachment number 100 to the second portion 90 of the hinged mounting plate 86.

As illustrated in FIG. 1, the bike rack system 10 contemplates supporting to electric or e-bikes 130. Accordingly, in addition to the illustrative examples provided above, different methods of attachment to the support member 14 are suitable, for example a clamp, screw, pin or other means of attachment, as long as they provide sufficient rigidity to support the bike rack 32.

FIGS. 2 and 3 show an example of one embodiment of the license plate holder 36. The license plate holder includes tabs 38 that align with slots 44 on the decklid/trunk lid or liftgate 16 of the vehicle 12 and support the bottom of the license plate holder 36 in position on the vehicle 12. As set forth previously, the license plate holder 36 includes a latch mechanism 40 that locks the license plate holder 36 and corresponding license plate 34 in place on decklid/trunk lid or liftgate 16 of the vehicle. The license plate holder 36 may include reflectors allowing for additional visibility to other drivers.

In one example, the vehicle fob, associated with many vehicle features, operates the latch mechanism 40 whereby the license plate holder 36 will only release from the vehicle 12 upon receiving a signal from the fob. Another method of detaching the license plate holder 36 is use of a special key used to physically unlock the latch mechanism 40 enabling removal of the license plate holder 36 from the vehicle 12.

In a further example, the license plate holder 36 includes vehicle 12 backup sensors 114 and a rear-mounted camera 116. Electrical connectors 118 connect the backup sensors 114 and rear-mounted camera 116 to the vehicle 14. As illustrated in FIG. 2 the bike rack 32 includes a mounting bracket or plate 120 configured to receive the license plate holder 36. When the license plate 34 and corresponding license plate holder 36 are removed from the decklid/trunk lid or liftgate 16 of the vehicle 12 they are then attached to the mounting bracket or plate 120 on the bike rack 32. As illustrated, mounting bracket or plate 120 includes slots 132 receiving the tabs 38 of the license plate holder 36. The latch mechanism 40, engaging a corresponding aperture or opening 134 on the mounting bracket or plate 122, secure the license plate holder 36 to the mounting bracket or plate 120. As illustrated, the mounting bracket or plate 122 includes a pair of arms 136 slidably received in the bike rack tubular members 138 of the bike rack 32. Electrical or communication cables 122 located on the bike rack 32 connect the backup sensors 114 and rear-mounted camera 116 to the vehicle 12. In this manner, the backup sensors 114 and rear-mounted camera 116 are still functional; that is, not obscured by the bike rack 32. This allows the vehicle operator to use the backup sensors 114, rear mounted camera 116 and if available the park assist program regardless of bike rack 32, and any bikes supported thereon, extending from the rear of the vehicle 12. Further, the bike rack 32 does not obscure the license plate 34.

In a further embodiment, charging outlets 124 suitable for charging an electric bike, shown schematically in FIG. 1, are located behind the license plate holder 36 on the decklid/trunk lid or liftgate 16 of the vehicle 12. FIG. 1 illustrates a charging cable 126 extending from the charging outlet 124 to a power source 128 located on the electric bike 130. In addition to charging an electric bike 130, other charging ports may be available, such as a USB port, suitable for charging other electronic devices. In this way, such devices, including the electric bike 130, would not lose power during transport. When not in use, the charging outlets or ports 124 may be capped and ultimately covered by the license plate holder 36.

Figure 8:
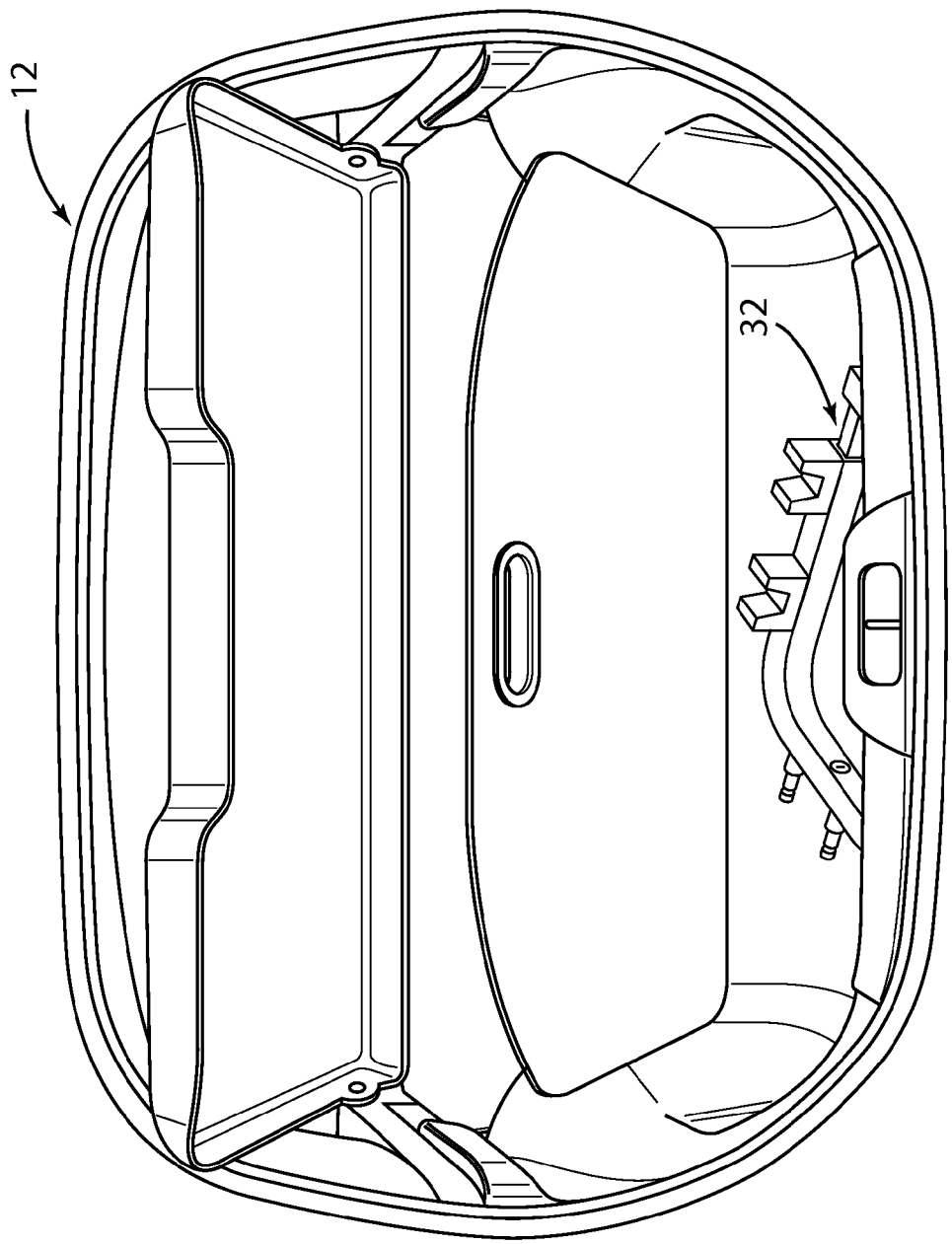
FIG. 8 is a perspective view illustrating the bike rack stored within the luggage compartment of the vehicle.

FIG. 8 shows the bike rack 32 easily stowed in the rear of the vehicle 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mechanism for attaching a bike rack to a vehicle comprising:
    a support member fixedly secured to said vehicle including a truss located behind an exterior wall of said vehicle;
    an attachment assembly, secured to said support member, including a receiver, said receiver operative to move between a first, stowed position and a second, use position; and
    said exterior wall including a removable portion, wherein said attachment assembly is located behind said removable portion.

2. A mechanism as set forth in claim 1 wherein said attachment assembly contains a pivotable portion.

3. A mechanism as set forth in claim 2 wherein said attachment assembly folds adjacent to said support member when said attachment assembly is in said first, stowed position.

4. A mechanism as set forth in claim 2 wherein removing said removable portion of said exterior wall provides an opening; and
    at least a portion of said attachment assembly extends outwardly into said opening when said attachment assembly is in said second, use position.

5. A mechanism as set forth in claim 1 wherein said attachment assembly includes a bracket and a receiver; and
    said receiver including a U-shaped tubular member pivotally connected to said bracket.

6. A mechanism as set forth in claim 1 wherein said removable portion includes a license plate holder.

7. A mechanism for attaching a bike rack to a vehicle comprising:
    a support member, said support member located behind an exterior wall of said vehicle;
    an attachment assembly, said attachment assembly including a receiver, said receiver operative to move between a first, stowed position and a second, use position;
    a removable license plate holder, including a tab and a latch mechanism wherein said tab aligns with a slot located on said exterior wall of said vehicle said secured to said exterior wall of said vehicle and said latch mechanism engages said vehicle to secure said removable license plate holder to said vehicle; and
    said attachment assembly located behind said license plate holder.

8. A mechanism as set forth in claim 7 including a sensor mounted to said license plate holder.

9. A mechanism as set forth in claim 8 wherein said sensor is a backup sensor.

10. A mechanism as set forth in claim 7 including a camera mounted to said license plate holder.

11. A mechanism as set forth in claim 7 wherein said latch mechanism includes a lock.

12. A mechanism as set forth in claim 11 wherein said lock is controlled with a fob.

13. A method of attaching a bike rack to a vehicle, wherein the vehicle has a license plate bracket attached thereto, the method comprising the steps of:
    providing a support member and positioning said support member behind an exterior wall of said vehicle;
    providing an attachment assembly, said attachment assembly including a receiver, said receiver operative to move between a first, stowed position and a second, use position;
    providing said exterior wall with an opening adjacent said attachment assembly allowing access to said attachment assembly, said opening disposed behind said license plate bracket;
    removing said license plate bracket prior to attaching the bike rack to the vehicle;
    connecting the bike rack to said attachment assembly; and
    attaching said license plate bracket to a distal end of the bike rack.

14. A method as set forth in claim 13 wherein said attachment assembly includes a pivotable receiver, said attachment assembly positioned in said first stowed position when said license plate bracket is attached to said exterior wall of said vehicle and positioned in said second, use position when said license plate bracket is removed from said exterior wall of said vehicle.

15. A method as set forth in claim 13 including mounting a sensor to said license plate bracket and using said sensor to provide information to said driver when said license plate bracket is attached to said distal end of the bike rack.

16. A method as set forth in claim 13 including mounting a rear-backup camera to said license plate bracket and using said rear-backup camera to provide information to said driver when said license plate bracket is attached to said distal end of the bike rack.

17. A method as set forth in claim 13 including providing a charging port on said vehicle, said charging outlet located behind said license plate bracket wherein removal of said license plate bracket enables access to said charging outlet.

18. A method as set forth in claim 13 wherein said bike rack may be folded and stored in the vehicle storage compartment.

* * * * *